United States Patent [19]

Math

[11] 4,343,124
[45] Aug. 10, 1982

[54] STRUCTURAL ELEMENTS

[75] Inventor: Friedrich C. Math, Farnham, England

[73] Assignee: The British Petroleum Company Limited, London, England

[21] Appl. No.: 144,173

[22] Filed: Apr. 25, 1980

[30] Foreign Application Priority Data

Apr. 26, 1979 [GB] United Kingdom ............... 7914503

[51] Int. Cl.³ ............................................. E04C 3/10
[52] U.S. Cl. .................................. 52/226; 52/309.1; 52/639; 428/542
[58] Field of Search ............... 52/222, 639, 225, 226, 52/309.1; 428/542

[56] References Cited

U.S. PATENT DOCUMENTS 3,058,550 10/1962 Richter ................................ 52/222
3,377,637 4/1968 Famorano ...................... 52/639 X
3,473,272 10/1969 Hasselquist .................. 52/222 X

FOREIGN PATENT DOCUMENTS 2004835 4/1979 United Kingdom .

Primary Examiner—Carl D. Friedman
Attorney, Agent, or Firm—Morgan, Finnegan, Pine, Foley & Lee

[57] ABSTRACT

A cured structural building element formed by winding and curing resin saturated glass fibre on a former. The element takes the form of a rod or beam having pairs of projections pointing towards each other at an angle to the rod or beam. The heads of the projections are arranged to lock together upon bending of the rod or beam to form a curved rigid element.

7 Claims, 4 Drawing Figures

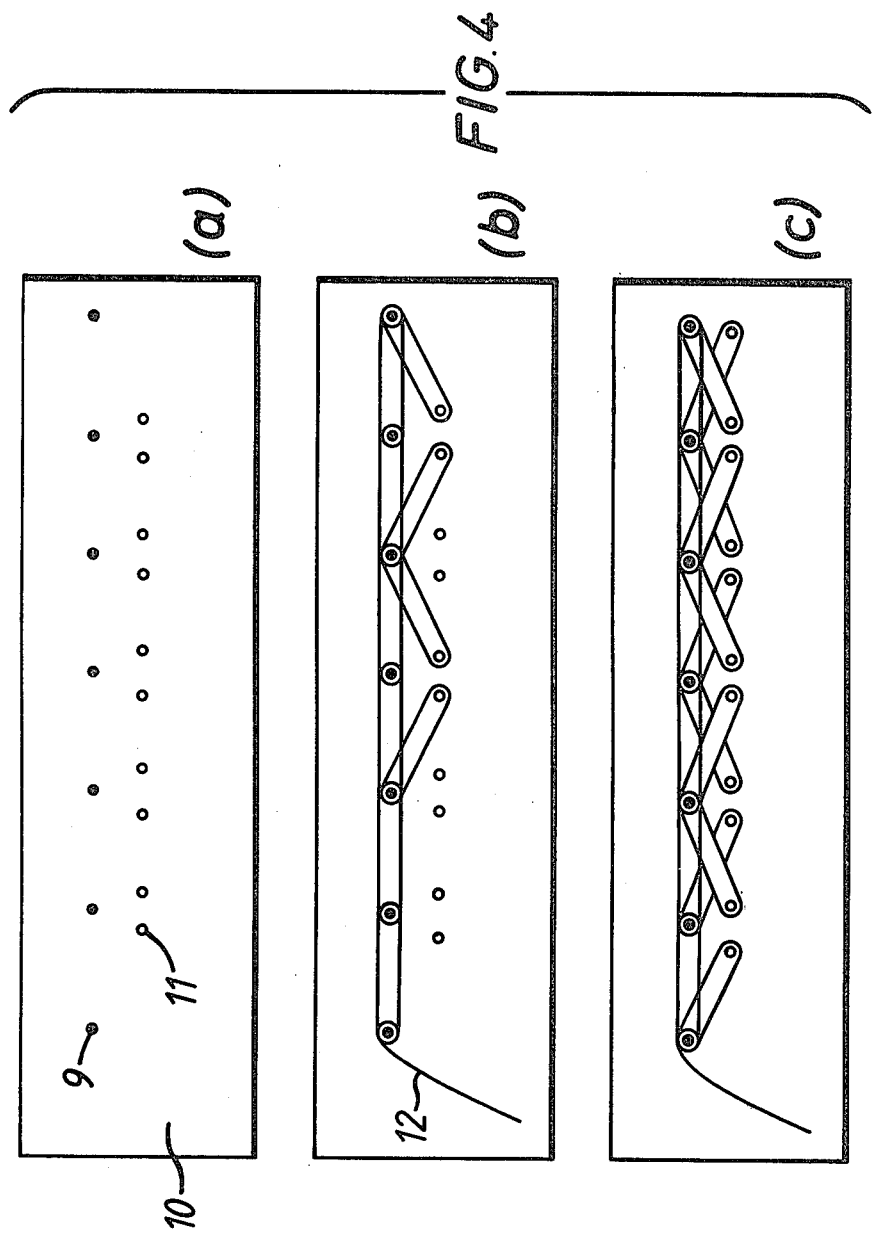

STRUCTURAL ELEMENTS

The present invention relates to structural elements formed from fibre or filament reinforced materials.

Curved structural support members such as beams or rods are commonly used in certain structures such as greenhouses. Further, these type of structures are often sold in kit form for assembly on site or at home. For facilitating transport of these structures it is desirable that the members are linear but are capable of being resorted to their functional curved shape on site. Steel tube is a common material for constructing curved structural support members. The material properties of steel are such that initial stressing by bending occurs in an elastic region of the loading curve. If the applied load is removed the steel will return to its original shape. In steel the elastic region is very small, (i. e. less than 0.5% strain). On bending the steel beyond the elastic region, permanent deformation occurs and the steel member retains its bent or curved state. This process is easily carried out on site when erecting a curved structure.

The material characteristics of glass reinforced plastics (GRD) are different from steel. The composite material has a much greater elastic region (2% to 5%) and component failure (by a process of composite delamination) occurs immediately following the end point of the elastic region. This means it is not possible to permanently deform a GRP member, e.g. from a straight to a curved member. The present invention is directed towards adapting glass reinforced plastics material so as to be able to achieve a desired curvature.

British patent application No. 2004835 A relates to lattice structures formed from cured resin impregnated fibre strands. Structures formed in this manner have high tensile strength but relatively low modulus. To increase this low modulus would require an increase of cross section of the beam to increase its moment of inertia. Such a complete lattice beam would be rigid and would not help ease of stacking for transport. By the use of beams, for example, having inter-engaging lockable projecting members this problem can be alleviated.

Thus, according to the present invention there is provided a structural building element comprising a rod or beam of a glass reinforced plastics material, the element also having a plurality of projections along its length, the projections being adapted so that upon bending of the rod or beam to a pre-determined curvature, pairs of projections co-operate to make the element rigid.

By use of co-operating projections in a glass reinforced plastics structural element, its rigidity in the curved state is increased by increasing the moment of inertia. In normal structural beams, e.g. rolled steel joists (RSJ), stiffness is proportional to their moment of inertia. The most common way of increasing the moment of inertia is to increase the depth of the beam. It is not necessary to use solid material to increase the beam depth in order to obtain the improved thickness. It is possible to use a bridging lattice structure. A similar effect is utilised in the construction of roof frames in which tube angle or beam is made up into a two dimensional ridge frame.

In the present invention the member with the unlinked projections is termed a one dimensional structure. The process of interlocking the projections produces a two dimensional structure. By a similar means the invention may take a two dimension structure (a one dimensional structure with depth) and by interlocking produce a three dimensional structure.

A rod or beam having projections along its length which upon bending allows the projections to interengage and lock has advantages of producing a permanently curved structure and increasing the moment of inertial along the beam to thereby give increased stiffness.

In order to obtain the desired convex curvature of the element, the length of the arms of each pair of projections is less than the distance along the element between the joining points of the projections to the element. The acute angle between the projections and the rod or beam is small and preferably from 5° to 10°.

The invention will now be described by way of example only with reference to FIGS. 1 to 4 of the accompanying drawings. FIGS. 1 and 2 show one and two dimensional structural building elements according to the invention.

FIG. 3(A) shows the initial pre-curved dimensions and FIGS. 3(B) and 3(C) show the curved dimensions of the rod or beam structure.

FIG. 4 shows a diagrammatic top plan view of an arrangement for fabricating curved structures. FIG. 4(A) shows a plan view from above of a support for winding the structures. FIG. 4(B) shows a plan view of a partially wound structure and FIG. 4(C) shows a plan view of a fully wound pre-curved structure on the support.

Figure 1:
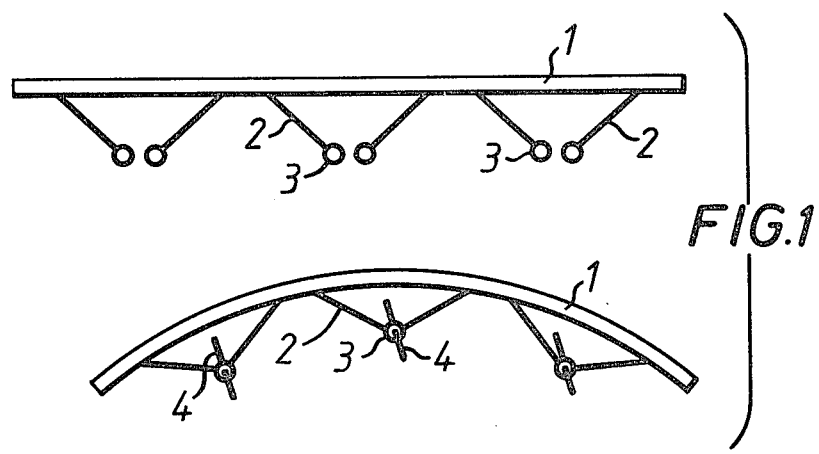
FIG. 1 shows two perspective views of a rod structure, the first view being a rod in its pre-curved form, the second view being the rod in its locked and curved form.

In FIG. 1, a linear beam 1 has pairs of projections 2 angled towards each other, each projection 2 having an eye or ring 3 at its end. The projections 2 are in such position on the beam 1 that the beam 1 can be bent so that the rings 3 on the projections lie adjacent to each other. Locating ties 4 can be passed through each set of pairs of rings 3 so as to hold the beam 1 in its curved form.

Figure 2:
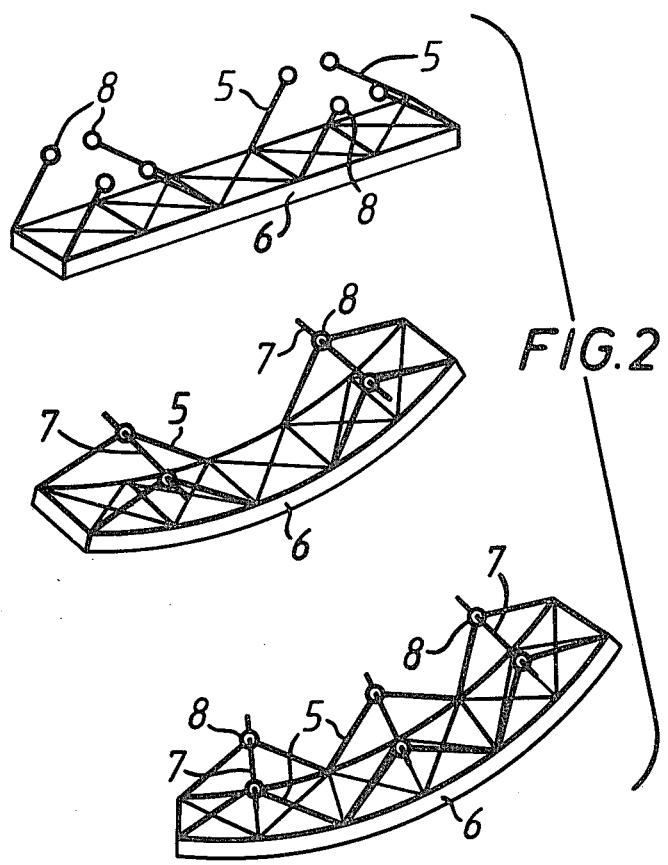
FIG. 2 shows three perspective views of a beam structure, the first view being a beam structure in its precurved form, the second view being the beam structure in its locked and curved form, and the third view relates to an alternative beam structure in its locked and curved form.

FIG. 2 shows a similar arrangement for a two dimensional beam. Thus, a number of pairs of projections 5 across the length of beam 6 hold the beam 6 in its curved formed by use of locating ties 7 passing through the adjacent rings 8 of the projections 5.

Also, alternatively or in addition, a longitudinal rod having eyes can be arranged to link with the projections and ties to provide further stiffening of the structure.

The structures are constructed by winding a single bundle of continuous glass fibres or rovings soaked in a polyester resin around formers to produce three-dimensional structures.

The continuous strand is produced by passing three continuous bundles of glass fibre rovings through a bath of polyester resin and then through an orifice plate to give a roughly uniform strand diameter. (not shown). The glass fibre rovings are Vetrotex (EC14, 2400 Tex) produced by St. Gobain Industries (S-22) and each bundle of rovings contains about 208 fibres of about 10 microns diameter. The polyester resin is Cellobond A2785 CV (BP Chemicals Ltd) using MEX peroxide catalyst and 0.6% cobalt solution as accelerator. The formulations are chosen so that easy wetting of the fibre occurs but with sufficient viscosity to reduce run-off tendency. Also it is desirable that complete winding of the structures is achieved before setting of the resin and so a suitable resin gelation time is chosen. After winding, the structures are allowed to cure at room temperature for several hours, depending on the formulation.

The continuous polyester resin impregnated fibre is wound under tension by the operator or automatically in sequence from projecting members, hooks or pins on the former to define the rod or beam shape. The hooks or pins are coated with a suitable mould release agent to allow ease of separation of the former from the strands.

To enhance the strength of the structure, the strands of resin impregnated glass fibre are repeatedly wound between a pair of hooks until the desired thickness of fibre is attained so as to strengthen the structure at desired points.

Figure 3:
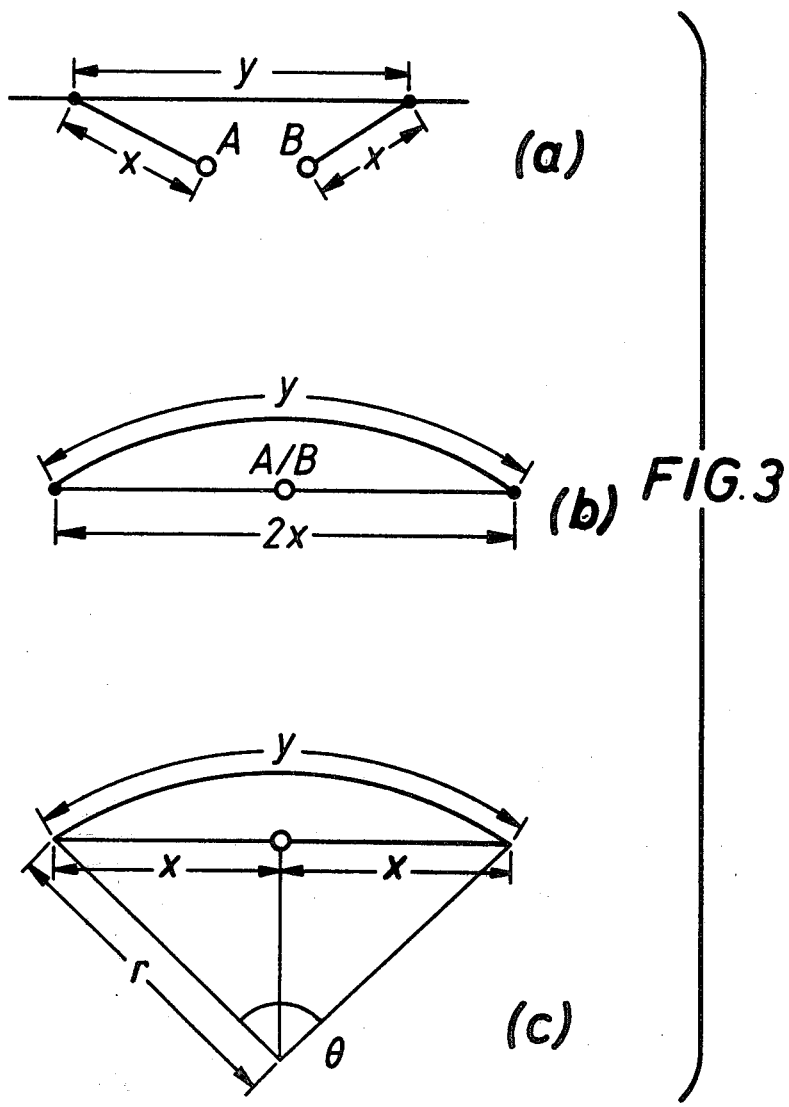
FIG. 3 shows a sequence of plan views of a rod or beam structure.

As shown in FIG. 3, in order to form the curved structural element with increased moment of inertia the beam must adopt the configuration shown in FIGS. 3(a) to 3(c). Thus distance y is greater than twice the distance x and upon bending FIG. 3(b) configuration is obtained with points A and B coincident. As shown in FIG. 3(c), the radius of curvature (r) of the curved structural element may be obtained by resolution of equations, $y = 2\pi r \theta/360$ where $\theta$ is measured in degrees and $x = r \sin \theta/2$.

In order to produce a rod structure according to the invention, the arrangement shown in FIG. 4 may be used. Thus, a number of pins 9 are fixed into a support 10 to define the length of the rod. Also a number of pegs 11 are arranged in pairs and fixed to the support. The pegs 11 are arranged to be able to co-operate together when the element has been prepared. A continuous resin wetted filament 12 is then passed around the pins 9 and pegs 11, the process being repeated until a structure of desired size and strength is obtained. Winding may be made preferentially around certain pins or pegs in order to obtain selective strengthening of the structure. After winding, the element is cured and the pins 9 removed to leave a linear rod having pair of projecting interconnectable arms.

In use of the rods, the cured rod is then bent so that the pairs of pegs 11 are aligned and can be locked together, for example, with a peg or by some form of snap fitting to form a rigid curved element. These stiff curved structural elements may be used, for example as roofing members in greenhouses, sheds etc.

I claim:

1. A structural building element comprising an elongate member of a fibre reinforced plastics material capable of limited flexing, pairs of rigid projecting means located along and connected to said elongate member, said projecting means having means adapted to engage and lock with a neighboring projecting means upon flexing of said elongate member.

2. An element according to claim 1 wherein the elongate member comprises a cured resin saturated continuous fibre.

3. An element according to claims 1 or 2 in which the projections are comprisesd of glass reinforced plastics material.

4. An element according to claims 1 or 2 in which pairs of projections point toward each other and are at an acute angle to the direction of the elongate before curvature.

5. An element according to claim 4 in which the acute angle is from 5° to 10°.

6. An element according to claims 1 or 2 in which the pair of projections co-operate by means of locating tie or bar.

7. An element according to claims 1 or 2 in which the pair of projections are adapted for snap fitting.

* * * * *

REEXAMINATION CERTIFICATE (290th)

United States Patent [19]

Math

[11] B1 4,343,124

[45] Certificate Issued Dec. 25, 1984

[54] STRUCTURAL ELEMENTS

[75] Inventor: Friedrich C. Math, Farnham, England

[73] Assignee: The British Petroleum Company Limited, London, England

Reexamination Request:
No. 90/000,392, Jun. 10, 1983

Reexamination Certificate for:
Patent No.: 4,343,124
Issued: Aug. 10, 1982
Appl. No.: 144,173
Filed: Apr. 25, 1980

[30] Foreign Application Priority Data

Apr. 26, 1979 [GB] United Kingdom ................ 7914503

[51] Int. Cl.³ .............................................. E04C 3/10
[52] U.S. Cl. ..................... 52/226; 52/309.1; 52/639; 428/542

[58] Field of Search ..................... 52/86, 644

[56] References Cited

U.S. PATENT DOCUMENTS

| | | | |
|---|---|---|---|
| 3,019,491 | 2/1962 | Troutner | 52/644 |
| 3,260,022 | 7/1966 | Guyer et al. | 52/86 |
| 3,473,272 | 10/1969 | Hasselquist | 52/222 |
| 4,089,148 | 5/1978 | Oehmsen et al. | 52/644 X |

FOREIGN PATENT DOCUMENTS

| | | | |
|---|---|---|---|
| 2451526 | 5/1975 | Fed. Rep. of Germany . | |
| 1202706 | 8/1970 | United Kingdom | 52/86 |
| 2004835 | 4/1979 | United Kingdom . | |

*Primary Examiner*—Alfred C. Perham

[57] ABSTRACT

A cured structural building element formed by winding and curing resin saturated glass fibre on a former. The element takes the form of a rod or beam having pairs of projections pointing towards each other at an angle to the rod or beam. The heads of the projections are arranged to lock together upon bending of the rod or beam to form a curved rigid element.

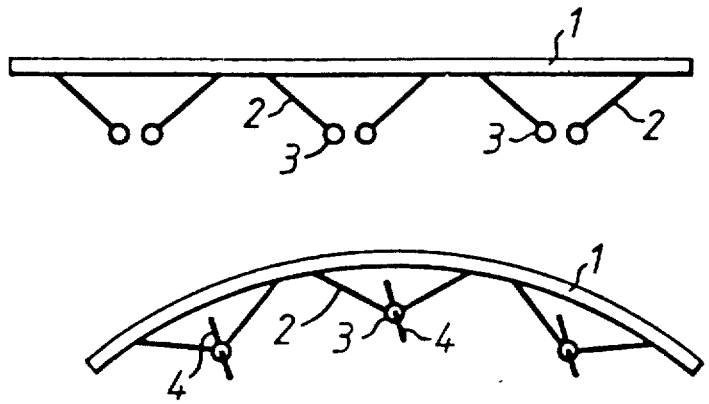

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claim 1 is cancelled.

Claims 2-4 and 6, 7 are determined to be patentable as amended.

Claim 5, dependent on an amended claim, is determined to be patentable.

New claim 8 is added and determined to be patentable.

2. An element according to claim [1] *8* wherein the elongate member comprises a cured resin saturated continuous fibre.

3. An element according to claims [1] *8* or 2 in which the projections are comprised of glass reinforced plastics material.

4. An element according to claims [1] *8* or 2 in which pairs of projections point toward each other and are at an acute angle to the direction of the elongate before curvature.

6. An element according to claims [1] *8* or 2 in which the pair of projections co-operate by means of locating tie or bar.

7. An element according to claims [1] *8* or 2 in which the pair of projections are adapted for snap fitting.

*8. A structural building element comprising a resilient linear elongate member of a fibre reinforced plastics material capable of limited flexing into a curved shape on site, pairs of rigid projecting means located along and integral with said elongate member, said rigid projecting means having at its ends means adapted to interengage and be locked with its neighboring projecting means upon flexing of said elongate member so as to form a curved rigid structure, the length of each pair of projecting means being less than the distance along the elongate member between the joining points of the projecting means to the elongate member.*

* * * * *